Oct. 13, 1953 C. M. WOLFE ET AL 2,655,043
PRESSURE MEASURING DEVICE
Filed June 14, 1948 2 Sheets-Sheet 1
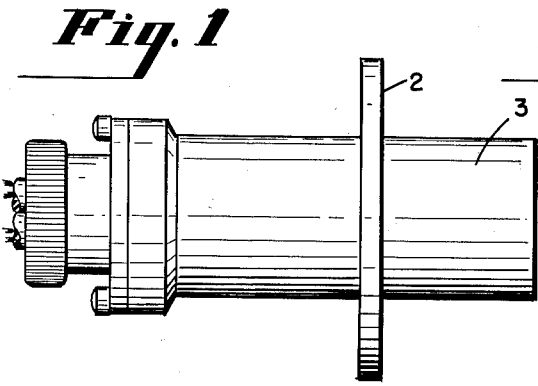
*Fig. 1*
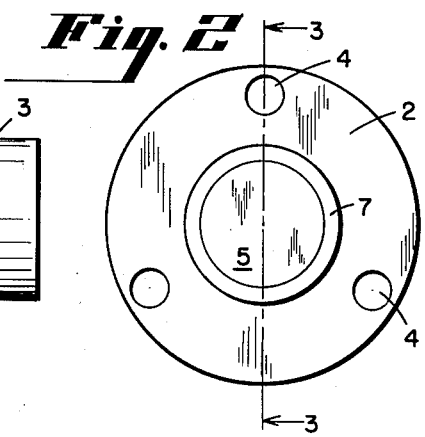
*Fig. 2*
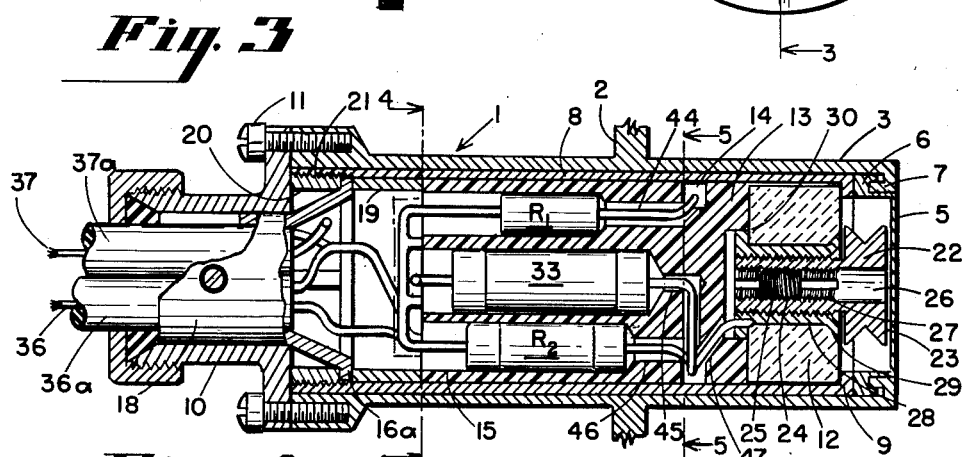
*Fig. 3*
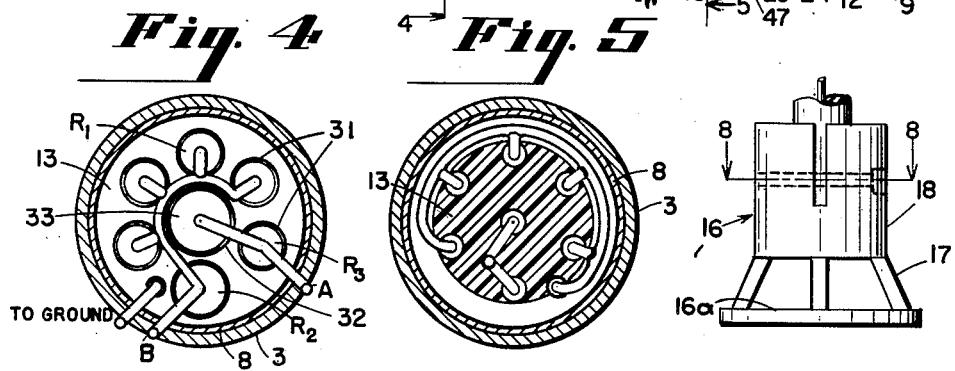
*Fig. 4*  *Fig. 5*  *Fig. 7*
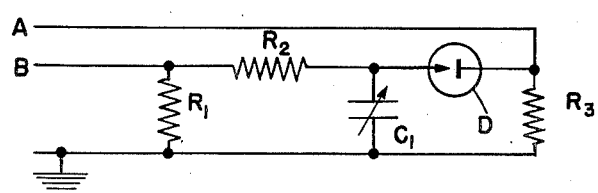
*Fig. 6*
INVENTOR.
CHARLES M. WOLFE
QUIDO M. SHULTISE
BY CLYDE W. GROW
D. Gordon Angus
ATTORNEY Oct. 13, 1953     C. M. WOLFE ET AL     2,655,043
PRESSURE MEASURING DEVICE
Filed June 14, 1948     2 Sheets-Sheet 2
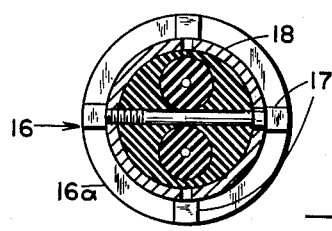
*Fig. 8*
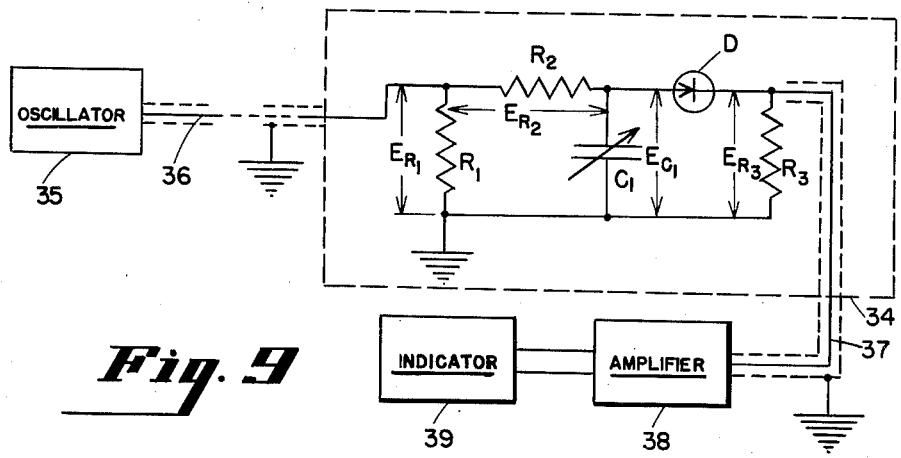
*Fig. 9*
*Fig. 9a*
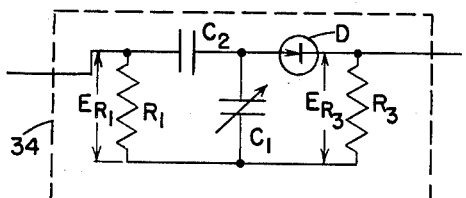
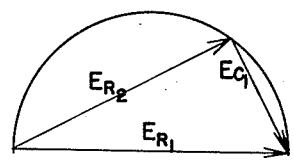
*Fig. 10*
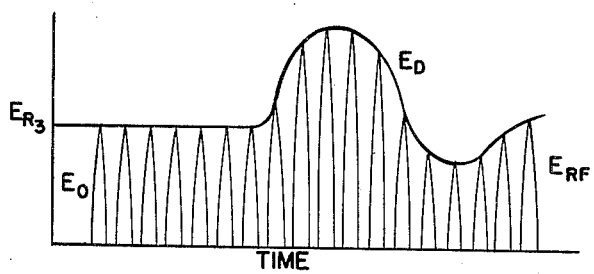
*Fig. 11*
INVENTORS
CHARLES M. WOLFE
QUIDO M. SHULTISE
BY CLYDE W. GROW
D. Gordon Angus
ATTORNEY Patented Oct. 13, 1953

2,655,043

UNITED STATES PATENT OFFICE 2,655,043

PRESSURE MEASURING DEVICE

Charles M. Wolfe, Glendora, Quido M. Shultise, Pasadena, and Clyde W. Grow, Sierra Madre, Calif., assignors, by mesne assignments, to Aerojet-General Corporation, Cincinnati, Ohio, a corporation of Ohio Application June 14, 1948, Serial No. 32,888

2 Claims. (Cl. 73—398)

1

This invention relates to electrical pressure-detecting systems, and more particularly to arrangements of this character which are adapted for measurement of rapidly varying pressure and other phenomena of a similar nature.

Objects of the invention are to provide a displacement-detecting arrangement of the varying capacitance type which is of a relatively small, compact and simple design and is easily usable.

Displacement detecting or pickup devices and systems have heretofore been proposed for measuring variations of pressure such as occur in a device like a jet propulsion motor operated by intermittent explosions. Such applications of a pickup pose problems due to wide variations in rapidly varying pressure both above and below atmospheric, and also due to high temperatures. It is desired furthermore that a pickup device for such a purpose be extremely sensitive, and be capable of responding quite accurately to pressure variations over a wide range of intensities and frequencies under the adverse conditions of measurement.

In accordance with our invention, we provide a pickup or pressure detecting device and system especially adapted for the above purposes.

Our pickup comprises a variable condenser formed by variation of capacity due to a pressure-responsive diaphragm; and the pickup is incorporated in a system comprising a radio frequency oscillator, the output of which is applied to the pickup circuit. The alternating voltage on the variable condenser is modulated in conformance with displacement of the condenser diaphragm. This modulated radio frequency is rectified in a rectifier, and the rectified output is sent to an indicating or recording device such as an oscillograph, preferably through a low gain amplifier.

Preferred features of the system comprise the use of a pad of resistors between the variable capacity of the pickup and the oscillator, for the purpose of matching the impedance of the pickup with that of the line from the oscillator.

An important feature of the pickup construction resides in a compact arrangement of a rectifier and resistor associated with the pickup capacity and the rectifier.

The foregoing and other features of our invention will be better understood from the following detailed description and the accompanying drawing, of which:

Fig. 1 is a side elevation view of a pickup unit according to our invention;

Fig. 2 is a view of the pressure responsive end of the pickup unit;

2

Fig. 3 is a cross-section view of the unit taken on line 3—3 of Fig. 2;

Fig. 4 is a view taken on the line 4—4 of Fig. 3;

Fig. 5 is a cross-section view taken on the line 5—5 of Fig. 3;

Fig. 6 is a view schematically showing the electrical circuit of the pickup unit proper;

Fig. 7 is a side elevation view of the cable retainer;

Fig. 8 is a cross-section view of the cable retainer taken on the line 8—8 of Fig. 7;

Fig. 9 is a schematic wiring diagram of the entire electric system employing the pickup unit of Figs. 1 to 8;

Fig. 9a is a schematic wiring diagram of a modified form of wiring diagram which can be substituted for a corresponding portion of the diagram of Fig. 9;

Fig. 10 is a vector diagram for the circuit; and

Fig. 11 is a curve showing the rectified output voltage vs. time.

Referring to the drawing, the pickup comprises a housing 1 which is of a generally cylindrical shape having integral with it a peripheral flange 2 back of the front end portion 3. A number of bolt holes 4 are provided around the flange 2, so that bolts may be passed through them to bolt the pickup to the wall of the chamber or device in which the pressure is to be measured. For example, it may be desired to measure the changes of pressure within the combustion chamber of a jet motor or aeroresonator or the like; in which case, a hole may be provided in the wall of the combustion chamber large enough to insert the front end 3 of the pickup and to bolt the flange 2 to the chamber wall. At the front end of the pickup there is provided a variable condenser one plate of which is adapted to displacement in accordance with variations of pressure. This comprises a diaphragm 5 fastened at the front end; and provision is made for fastening it, comprising a reentrant peripheral flange 6 integral with the diaphragm and adapted to register with a corresponding reentrant flange 7 formed around the periphery of the forward housing.

The circular diaphragm portion 5 is made sufficiently thin and flexible and designed so that the displacement of the diaphragm is linearly proportional to the differential pressure. The diaphragm is held in its forward position against the flange 7 by means of a cylindrical sleeve 8 having a forward peripheral flange 9 which abuts a flange 6; and the rear end of sleeve 8 extends out to the rear end of cylindrical housing 1 and preferably just a slight amount beyond, so that when the rear cap 10 is bolted in position against the peripheral end of housing 1 by bolts 11, it tightens against the end of sleeve 8 to force it firmly against flange 6. Within the forward end of the sleeve 8 there is placed an annular insulating member 12, for example, of porcelain or glass or the like, which is abutted against the flange 9 and is held in the forward position by an insulating member 13 which extends across the cross-section of the pickup. Insulator 13 is integral with insulator portion 15. The insulators 13 and 15 may conveniently be made of a hard rubber or the like. Insulating cylinders 13 and 15 may also be replaced by a metal cylinder of similar construction provided with sufficient clearance about the element connections of $R_1$, $R_2$ $R_3$ and 33 to permit electrical insulation. The advantage of the use of the brass cylinder is that a high degree of electrical shielding is insured between the circuit elements. This can also be accomplished by metal plating certain surfaces of insulator 13 and 15.

At the rear of insulator 15 there is placed a circular collar 19. Adjacent to collar 19 there is a spider 16 which has a flange 16a that contacts circular collar 19. Spider 16 is provided with arms 17 which support a cylindrical sleeve 18 designed to fit within the sleeve of member 10. The assembly of collar 16 and the sleeves 19 and 15 and the members ahead of it are held in position by an internal nut 20 which threads into threads 21 formed at the rear of sleeve 8. Then after the nut 21 is tightened up to tighten the assembly, the rear member 10 is slid over the sleeve 18 and bolted in position.

There is provided immediately back of the diaphragm 5 an electrode 22 in the form of a button having a flat surface 23 parallel to the rear surface of the diaphragm 5 and spaced therefrom by a small amount to create an electrical capacity; and the button has a stem 24 which is threaded on both its inside and outside surfaces. The outer threads of shank 24 are threaded into a metallic sleeve 28 within the insulator annulus 12. In order to form a secure engagement with the annulus, the forward portion of member 28 is provided with bevel 29 and the rear portion is provided with a shoulder 30 to engage corresponding surfaces of the insulator annulus. To bind the stem 24 within the sleeve 28, there is provided a threaded screw 25 for threading into the internal threads of the stem; and to produce the binding action, these internal threads of the stem gradually reduce in diameter in the forward direction so that the binding action of the screw progressively increases as the screw penetrates further into the stem. The stem is a split stem so that its split walls will thus be expanded outwardly to bind against sleeve 28. By this expedient the forward and rearward position of the condenser button 22, relative to diaphragm 5 may be adjusted to any desired position, and then bound in this position by tightening down the set screw 25, for example, by a set screw provided with a hexagon depression that may be tightened with a hexagon wrench.

In addition to the variable condenser element just described, the pickup also contains a rectifier element and resistor elements. To support these elements the cylinder 15 is provided with a number of bores 31, arranged around the periphery, and into which there are placed respective cartridge-type resistors, designated as $R_1$, $R_2$ and $R_3$, as indicated in Fig. 4. The cylinder 15 is also provided with a central bore or hole 32, into which is inserted a cartridge-type rectifier element 33, which is preferably a half-wave crystal rectifier of a type which is available in small cartridge form.

The arrangement of the electrical elements within the casing facilitates the interconnection of the elements by wiring; and for this purpose suitable holes 44, 45, 46 and 47 are provided through the insulators through which wires from the cartridges may pass. Concentric lines 36 and 37 having their respective outer conductors 36a and 37a are clamped into the fitting 16 and connected to the proper elements of the pickup. Figs. 3, 4 and 5 indicate part of the wiring of the elements; and although the wiring is not shown complete in these figures, a complete showing in this manner is unnecessary, in view of the schematic wiring diagrams of Figs. 6 and 9, which indicate how the wiring is completed.

Fig. 9 is a schematic view of the electrical system in the pickup device just described incorporated in a complete system for indicating pressure variations. The dotted rectangle 34 represents the pickup unit of Figs. 1 to 7; and the elements within the rectangle are the elements within the unit. The variable condenser $C_1$ represents the variable capacity between diaphragm 5 and the button 23; the half-wave rectifier D represents the cartridge rectifier 33; and the resistors $R_1$, $R_2$ and $R_3$ represent the same designated resistor elements in Figs. 3 and 4. It should be noted that the resistor $R_1$ is actually shown as four resistors connected in parallel, but it will be understood that only a single resistor $R_1$ of the proper value is required. The choice of whether to use one or more of these resistors in parallel will depend on convenience and ease of selection of values; and the over-all value of the parallel-arranged resistors should total the amount desired for $R_1$ in Fig. 8. The elements within the rectangle 34 constitute a network of which one side is grounded, the ground being the casing of the pickup unit. The ungrounded side of the resistor $R_1$ and of this network is connected to the output of a radio frequency oscillator 35 which should preferably be of the high frequency type within the range of about 5 to 100 megacycles per second; and the line 36 which couples the oscillator to the network should preferably be of the coaxial type having its outer conductor grounded. The coaxial line may be of some well known type having a characteristic impedance, for example of about 72 ohms resistance.

For best operation, the value of the resistance $R_1$ across the output of the coaxial line should approximately match the line impedance; so that for a 72 ohm line, the resistor $R_1$ should be about 72 ohms. The impedance of the circuit $R_2$—$C_1$ should be much greater than the resistance $R_1$ so that it does not have an appreciable effect as a shunt across $R_1$. For this purpose, $R_2$ should be much larger than $R_1$ and may conveniently have a value of about 1000 ohms when $R_1$ is in the order of 72 ohms. The air gap and size of the elements of condenser $C_1$ may conveniently be adjusted so that it has a capacity of about 20 mmf. at zero deflection.

The value of resistance $R_3$ across which the rectified voltage is developed should preferably be sufficiently high as not to dissipate much of the rectifier energy and may have a value in the order of about 10,000 ohms, where $R_1$ and $R_2$ are of the order of 72 ohms and 1000 ohms respectively. The distributed capacitance of the cable 31, Fig. 9 in combination with resistance element $R_3$ acts to filter the rectified voltage $E_{R_3}$, and to minimize any radio frequency standing wave on cable 37. The resistance $R_3$ can be located in the amplifier 38. A small fixed capacitance can be connected in the pickup to advantage, replacing resistance element $R_3$. This small fixed capacitance might be of the order of 500 mmfd. and would greatly reduce the amplitude of any radio frequency voltage appearing on cable 37. It will be understood that the foregoing values of the electrical elements are given by way of illustration rather than of limitation, and that many other combinations of values can be made to operate satisfactorily.

The output of the rectifier is connected through a grounded line 37 to the input of an amplifier 38 of a type adapted to amplify the rectified output, that is, the variations of the D. C. rectified voltage; and the amplified output is shown coupled to a suitable indicating device 39 which may, for example, be an oscillograph or oscilloscope.

Fig. 9a shows a modification of the portion of the system within the rectangle 34 which can be substituted for the corresponding portion in Fig. 9. The only change in Fig. 9a from the system of Fig. 9 resides in the substitution of a condenser $C_2$ for the resistor $R_2$ in Fig. 9. A good value for $C_2$ will be such as will make its impedance about the same as that suggested for $R_2$ above at the frequency of the oscillator. The condenser $C_2$ can be made of a size and shape to fit conveniently in the housing of the pickup in place of $R_2$.

In operation, the pickup unit will be attached in a conventional manner to the device such as a combustion or rocket motor chamber with the diaphragm end inserted into the chamber to receive the variations of pressure. The diaphragm will deflect in accordance with the pressure variations, to vary the capacity $C_1$ accordingly. The voltage conditions in the pickup are as shown by the vector diagram in Fig. 10, wherein the voltages $E_{R_2}$ and $E_{C_1}$ are shown to add up vectorially to the voltage $E_{R_1}$, which is across resistor $R_1$. Owing to the relatively low resistance of $R_1$, this radio frequency voltage $E_R$ is substantially constant. The voltage $E_{C_1}$ however, varies with the capacity variation with corresponding variation of voltage $E_{R_2}$ across resistor $R_2$. Accordingly, the voltage $E_{C_1}$ is applied to the rectifier D at a varying amplitude depending on the variations of pressure. This variation will correspondingly vary the rectified output represented by voltage $E_{R_3}$ across resistor $R_3$. This is indicated by the graph of Fig. 11 wherein voltage $E_{R_3}$ is plotted against time. The wave marked $E_{RF}$ represents the half-wave envelope of the oscillator frequency, and the envelope of this wave marked $E_D$ represents the variation of the rectified voltage. The voltage $E_O$ represents the rectified voltage developed at zero deflection of the diaphragm.

It will be recognized that the device and systems described and illustrated are subject to modification all within the scope of the invention. Many known additions and modifications may be made in the system, according to known practice. For example, filtering devices such as chokes and capacitors may be included in the amplifier following the rectified output to block the $R_F$ ripple voltage from the amplifier. Again, if desired, a balancing circuit may be included in this amplifier to balance out the steady state current corresponding to zero pressure which would otherwise be continuously applied to the indicator. Another modification which might be used, if desired, is the use of a cathode follower or other known form of coupling system for feeding the indicator, which may be a galvanometer or other suitable indicating or recording device.

It will be recognized that by our invention we have succeeded in combining the desirable features of a condenser type of pickup with a simplified electrical system, capable of measuring and transmitting rapidly varying pressure and other phenomena which can cause displacement of the condenser type pickup diaphragm.

Many advantages accrue from the use of our novel system. For example, it avoids the use of resonant circuits other than in the oscillator. Furthermore, the line between the pickup and the oscillator, as well as to the other apparatus connected with the pickup, are untuned and may be of any desired length; for example, 500 or 1000 foot lines are completely feasible.

The pickup unit itself possesses many advantages of its own. Its simplified construction with the resistors and rectifier located in proximity to the condenser furnishes the desired simplicity. No built-in tuning coil is required such as has been used in other pickup devices; and all the essential elements of the pickup can be of a very small size. As a result, the pickup need be only a fraction of the size of formerly used pickup units. The frequency response of the system is the equal or superior of other known systems, being limited merely by the natural frequency of the condenser diaphragm and by the response of the recording system. Furthermore, our complete system has proven to possess much greater stability than other systems employing condenser-type pickups. This is largely a result of using an untuned line from oscillator to pickup with a resistor $(R_1)$ which not only terminates the line in its characteristic impedance but also acts as a ballast load to minimize the effects of variations in line capacitance arising from temperature changes or vibration. A further factor of much importance which is an aid in producing high stability is the close proximity of the rectifier circuit elements to the variable condenser. It is thereby possible rigidly to tie down all leads, connections and circuit elements, thus avoiding the capacity changes usually arising within a pickup from vibration, shock and temperature changes.

We claim:

1. An electrical network having an input and an output and being adapted to transmit to an indicating means responsive to the output, signals from a source of oscillations connected across the input, which are modified in response to pressure variations received by a pickup of the type having a variable impedance element the impedance of which varies in accordance with said pressure variations, said network comprising a first resistance element shunted across said input, said variable impedance element and a second resistance element arranged in series with each other, the series arrangement being shunted across said first resistance element, a rectifier element and a third resistance element arranged in series with each other, said last-named series arrangement being shunted across said variable impedance element, said third resistance element being connected across said output, whereby D. C. voltage having variations of instantaneous value corresponding to the impedance variations of said variable impedance element is impressed across said output and received by the indicating means.

2. An electrical network having an input and an output and being adapted to transmit to an indicating means responsive to the output, signals from a source of oscillations connected across the input, which are modified in response to pressure variations received by a pickup of the type having a variable condenser element, the impedance of which varies in accordance with said pressure variations, said network comprising: a first resistance element shunted across said input, said variable condenser element and a second resistance element arranged in series with each other, the series arrangement being shunted across said first resistance element, and a rectifier element arranged in series between said output and the junction of the second resistance element and variable condenser element, whereby D. C. voltage having variations of instantaneous value corresponding to the impedance variations of said variable condenser element is impressed across said output and received by said indicating means.

CHARLES M. WOLFE.
QUIDO M. SHULTISE.
CLYDE W. GROW.

References Cited in the file of this patent

UNITED STATES PATENTS

| Number | Name | Date |
|---|---|---|
| 1,919,079 | St. Clair et al. | July 18, 1933 |
| 2,001,096 | Flanders | May 14, 1935 |
| 2,121,725 | Baumzweiger | June 21, 1938 |
| 2,178,471 | De Bruin | Oct. 31, 1939 |
| 2,367,866 | Humphreys et al. | Jan. 23, 1945 |
| 2,439,047 | Grimstead et al. | Apr. 6, 1948 |

OTHER REFERENCES

Book: "Mechanical Measurements by Electrical Methods" by Roberts—The Instrument Publishing Co., Pittsburgh, Pa., 1946, pages 2-30.